United States Patent  
Pratt et al.

(10) Patent No.: US 8,203,908 B2
(45) Date of Patent: Jun. 19, 2012

(54) INTELLIGENT EFFICIENT SERVO-ACTUATOR FOR A DOWNHOLE PULSER

(75) Inventors: F. Dale Pratt, Calgary (CA); Axel M. Schmidt, Calgary (CA); Kenneth A. Lambe, Calgary (CA)

(73) Assignee: Newsco Directional Support Services Inc., Calgary (CA)

( * ) Notice: Subject to any disclaimer, the term of this patent is extended or adjusted under 35 U.S.C. 154(b) by 159 days.

(21) Appl. No.: 12/168,002

(22) Filed: Jul. 3, 2008

(65) Prior Publication Data

US 2008/0267011 A1 Oct. 30, 2008

Related U.S. Application Data

(63) Continuation of application No. 11/101,033, filed on Apr. 6, 2005, now Pat. No. 7,564,741.

(60) Provisional application No. 60/560,047, filed on Apr. 6, 2004.

(30) Foreign Application Priority Data

Apr. 6, 2004 (CA) ..................................... 2463354

(51) Int. Cl.
 *E21B 47/18* (2006.01)
(52) U.S. Cl. ...... 367/83; 367/84; 340/854.3; 340/855.4; 340/856.4; 175/48; 175/50
(58) Field of Classification Search ............... 340/854.3, 340/855.4, 856.4; 367/83, 84; 175/48, 50
See application file for complete search history.

(56) References Cited

U.S. PATENT DOCUMENTS

| 3,488,030 A | | 1/1970 | Hulme et al. |
| 3,845,837 A | * | 11/1974 | McEvers et al. ............. 181/106 |
| 3,949,354 A | | 4/1976 | Claycomb |
| 3,958,217 A | | 5/1976 | Spinnler |
| 4,216,536 A | | 8/1980 | More |
| 4,367,794 A | | 1/1983 | Bednar et al. |
| 4,386,422 A | | 5/1983 | Mumby et al. |
| 4,401,134 A | | 8/1983 | Dailey |
| 4,515,225 A | | 5/1985 | Dailey |

(Continued)

FOREIGN PATENT DOCUMENTS

CA 1316702 4/1993

(Continued)

OTHER PUBLICATIONS

Microchip AN857, Brushless DC Motor Control Made Easy, 2002 Microchip Technology Inc., 48 pages.

(Continued)

*Primary Examiner* — Timothy Edwards, Jr.
(74) *Attorney, Agent, or Firm* — Blakely, Sokoloff, Taylor & Zafman LLP.

(57) ABSTRACT

An improved energy efficient intelligent pulser driver used for generating a mud pulse in a MWD (measurement while drilling) application. In the pulser driver, a direct current (DC) powered control circuit activates a three-phase DC brushless motor that operates a servo-valve. Opening of the servo-valve equalizes pressure in a plenum causing the operation of a main valve reducing flow area and causing a pressure spike in the mud column. Closing of the servo-valve creates a reduction in mud pressure that operates the main valve and increases the flow area causing an end to the pressure spike. The servo-valve is powered both in opening and closing operations by the motor.

2 Claims, 4 Drawing Sheets

U.S. PATENT DOCUMENTS

| | | | |
|---|---|---|---|
| 4,550,392 A | | 10/1985 | Mumby |
| 4,593,881 A | | 6/1986 | Yoshino |
| 4,618,808 A | | 10/1986 | Ish-Shalom et al. |
| 4,699,352 A | | 10/1987 | Mumby |
| 4,785,300 A | | 11/1988 | Chin et al. |
| 4,825,421 A | | 4/1989 | Jeter |
| 4,901,290 A | | 2/1990 | Feld et al. |
| 5,006,722 A | | 4/1991 | Adelson |
| 5,103,430 A | | 4/1992 | Jeter et al. |
| 5,115,415 A | * | 5/1992 | Mumby et al. ............ 367/85 |
| 5,117,398 A | | 5/1992 | Jeter |
| 5,176,164 A | * | 1/1993 | Boyle ............ 137/155 |
| 5,182,731 A | * | 1/1993 | Hoelscher et al. ............ 367/84 |
| 5,237,540 A | | 8/1993 | Malone |
| 5,320,421 A | | 6/1994 | Kade |
| 5,333,686 A | | 8/1994 | Vaughan et al. |
| 5,376,870 A | | 12/1994 | Ueda |
| 5,458,200 A | * | 10/1995 | Lagerlef et al. ............ 166/372 |
| 5,517,464 A | * | 5/1996 | Lerner et al. ............ 367/84 |
| 5,586,084 A | | 12/1996 | Barron et al. |
| 5,660,238 A | | 8/1997 | Earl et al. |
| 5,740,127 A | | 4/1998 | Van Steenwyk et al. |
| 5,787,052 A | * | 7/1998 | Gardner et al. ............ 367/84 |
| 6,002,643 A | | 12/1999 | Tchakarov et al. |
| 6,014,000 A | | 1/2000 | Gutierrez |
| 6,016,288 A | | 1/2000 | Frith |
| 6,044,857 A | | 4/2000 | Stege |
| 6,088,294 A | | 7/2000 | Leggett et al. |
| 6,097,310 A | | 8/2000 | Harrell et al. |
| 6,555,926 B2 | * | 4/2003 | Gondron ............ 290/1 R |
| 6,636,159 B1 | | 10/2003 | Winnacker ............ 340/854.3 |
| 6,714,138 B1 | * | 3/2004 | Turner et al. ............ 340/854.3 |
| 6,850,463 B2 | | 2/2005 | Winnacker |
| 6,891,481 B2 | * | 5/2005 | Dubinsky et al. ............ 340/854.4 |
| 6,932,319 B2 | | 8/2005 | Kowalski |
| 7,327,634 B2 | | 2/2008 | Perry et al. |
| 7,468,679 B2 | | 12/2008 | Feluch |
| 7,564,741 B2 | | 7/2009 | Pratt et al. |
| 2002/0117306 A1 | | 8/2002 | Hahn |
| 2003/0056985 A1 | | 3/2003 | Hahn |
| 2004/0012500 A1 | | 1/2004 | Hahn |
| 2004/0027917 A1 | | 2/2004 | Winnacker |
| 2005/0028522 A1 | * | 2/2005 | Fripp et al. ............ 60/533 |
| 2005/0231383 A1 | | 10/2005 | Pratt et al. |
| 2006/0034154 A1 | | 2/2006 | Perry et al. |
| 2006/0118334 A1 | | 6/2006 | Hahn et al. |
| 2007/0056771 A1 | | 3/2007 | Gopalan |

FOREIGN PATENT DOCUMENTS

| | | |
|---|---|---|
| CA | 2195722 | 1/1998 |
| CA | 2237017 | 2/1999 |
| CA | 2259819 | 8/1999 |
| CA | 2370987 | 8/2002 |
| CA | 2440815 | 9/2002 |
| CA | 2450459 | 12/2002 |
| CA | 2436069 | 2/2004 |
| CA | 2 463 354 | 10/2005 |
| CA | 2315981 | 6/2006 |
| DE | 19627719 | 1/1998 |
| EP | 0 588 389 | 3/1994 |
| GB | 2289117 | 8/1995 |
| WO | WO 02/101274 A1 | 12/2002 |

OTHER PUBLICATIONS

Wikipedia—Brushless DC Electric Motor, downloaded Jun. 23, 2011 at http://en.wikipedia.org/wiki/Brushless_DC_electric_motor, 8 pages.

ATMEL AVR443: Sensor-based control of three phase Brushless DC motor, 8-bit AVR Microcontrollers, 2006 Atmel Corporation, 7 pages.

Handbook of Electric Motors. 1 st edition, Richard Engelmann and William Middendorf editors, published by Marcel Dekker, Inc., 1995, pp. 120-121.

Protest in Respect of Canadian Patent Application No. 2,463,354, dated Dec. 19, 2007, 12 pages.

Protest in Respect of Canadian Patent Application No. 2,463,354, dated Mar. 7, 2007, 6 pages.

Protest in Respect of Canadian Patent Application No. 2,463,354, dated Feb. 20, 2008, 9 pages.

Protest in Respect of Canadian Patent Application No. 2,463,354, dated Feb. 13, 2007, 5 pages.

Protest in Respect of Canadian Patent Application No. 2,463,354, dated Jan. 13, 2010, 11 pages.

Protest in Respect of Canadian Patent Application No. 2,463,354, dated Jan. 11, 2010, 11 pages.

Canadian Office Action for Patent Application No. 2,463,354, dated Nov. 27, 2009, 2 pages.

Canadian Office Action for Patent Application No. 2,463,354, dated May 25, 2006, 4 pages.

Canadian Office Action for Patent Application No. 2,463,354, dated May 6, 2010, 2 pages.

Canadian Office Action for Patent Application No. 2,463,354, dated Apr. 15, 2009, 2 pages.

Canadian Office Action for Patent Application No. 2,463,354, dated Apr. 11, 2007, 6 pages.

Canadian Office Action for Patent Application No. 2,463,354, dated Apr. 7, 2008, 4 pages.

Canadian Office Action for Patent Application No. 2,463,354, dated Feb. 2, 2010, 1 page.

Protest under 37 CFR 1.291 in Respect of U.S. Appl. No. 11/479,412, mailed Apr. 20, 2009, 20 pages.

"Small Brushless DC Motor Technology Construction and Advantages", prior to Apr. 6, 2004, pp. 28-29.

Motion & Control NSK, "Miniature Precision Rolling Ball Screw RMA, RMS Series", 1996, 3 pages.

Canadian Intellectual Property Office, Protest to CA 2,463,354 (to which related U.S. Appl. No. 11/101,033 claims priority), Title: Intelligent Efficient Servo-actuator for a Downhole Pulser, Owner: Newsco Directional and Horizontal Drilling Services Inc, Feb. 3, 2009, 23 pages.

Supporting Documents for Protest to CA 2,463,354 (to which related U.S. Appl. No. 11/101,033 claims priority), Excerpts from the Public File History of US 6,016,288, pp. 1, 3 & 6 and Exhibit 5 of "The Bob Fournet Company's Supplemental Responses to Defendant's First Set of Interrogatories" and pp. 3 and 4 of "Defendant's Original Answer and Counterclaims to First Supplemental and Amending Petition of the Bob Fournet Company", Jan. 18, 2000, 85 pages.

Letter to US Patent and Trademark Office from V. Allan, Geolink, Aberdeen, Scotland, UK regarding related U.S. Appl. No. 11/101,033, Nov. 30, 2007, 3 pages.

Protest under 37 CFR 1.291 regarding related U.S. Appl. No. 11/101,033 from D. Doak Horne of Gowling Lafleur Henderson LLP with transmittal papers and references, Oct. 15, 2008, 106 pages.

Office Action for Counterpart Application No: 11/101,033, mailed Apr. 18, 2007, 8 pages.

Office Action for Counterpart Application No: 11/101,033, mailed Jan. 3, 2008, 8 pages.

Office Action for Counterpart Application No: 11/101,033, mailed Dec. 30, 2008, 10 pages.

"Small Brushless DC Motor Technology Construction and Advantages", pp. 28-29.

Motion & Control NSK, "Miniature Precision Rolling Ball Screw RMA, RMS Series", 3 pgs.

Canadian Office Action, Canadian Application No. 2,463,354; mailing date, May 25, 2006 (4 pp.).

\* cited by examiner

US 8,203,908 B2

INTELLIGENT EFFICIENT SERVO-ACTUATOR FOR A DOWNHOLE PULSER

CROSS REFERENCE TO RELATED APPLICATIONS

This is a continuation of U.S. patent application Ser. No. 11/101,033, filed on Apr. 6, 2005, which claims priority from U.S. Provisional Patent Application No. 60/560,047, filed Apr. 6, 2004, and Canadian Application No. 2,463,354, filed Apr. 6, 2004, which are incorporated herein by reference.

FIELD OF THE INVENTION

The present invention relates generally to a telemetry system, and in particular to a measurement while drilling (MWD) system. More particularly, the present invention relates to a servo-actuator for a downhole mud pulser for sending information from downhole to surface.

BACKGROUND OF THE INVENTION

The desirability and effectiveness of well logging systems where information is sensed in the well hole and transmitted to the surface through mud pulse telemetry has long been recognized. Mud pulse telemetry systems provide the driller at the surface with means for quickly determining various kinds of downhole information, most particularly information about the location, orientation and direction of the drill string at the bottom of the well in a directional drilling operation. During normal drilling operations, a continuous column of mud is circulating within the drill string from the surface of the well to the drilling bit at the bottom of the well and then back to the surface. Mud pulse telemetry repeatedly restricts the flow of mud to propagate signals through the mud upward to the surface, thereby providing a very fast communication link between the drill bit and the surface. Depending on the type of drilling fluid used, the velocity may vary between approximately 3000 and 5000 feet per second.

A telemetry system may be lowered on a wireline located within the drill string, but is usually formed as an integral part of a special drill collar inserted into the drill string near the drilling bit. The basic operational concept of mud pulse telemetry is to intermittently restrict the flow of mud as it passes through a downhole telemetry valve, thereby creating a pressure pulse in the mud stream that travels to the surface of the well. The information sensed by instrumentation in the vicinity of the drilling bit is encoded into a digital formatted signal and is transmitted by instructions to pulse the mud by intermittently actuating the telemetry valve, which restricts the mud flow in the drill string, thereby transmitting pulses to the well surface where the pulses are detected and transformed into electrical signals which can be decoded and processed to reveal transmitted information.

Representative examples of previous mud pulse telemetry systems may be found in U.S. Pat. Nos. 3,949,354; 3,958,217; 4,216,536; 4,401,134; and 4,515,225.

Representative samples of mud pulse generators may be found in U.S. Pat. Nos. 4,386,422; 4,699,352; 5,103,420; and 5,787,052.

A telemetry system capable of performing the desired function with minimal control energy is desirable, since the systems are typically powered by finite-storage batteries. One such example is found in U.S. Pat. No. 5,333,686, which describes a mud pulser having a main valve biased against a narrowed portion of the mud flowpath to restrict the flow of mud, with periodic actuation of the main valve to allow mud to temporarily flow freely within the flowpath. The main valve is actuated by a pilot valve that can be moved with minimal force. The pilot valve additionally provides for pressure equalization, thereby increasing the life of downhole batteries.

Another example of an energy efficient mud pulser is described in U.S. Pat. No. 6,016,288, the mud pulser having a DC motor electrically powered to drive a planetary gear which in turn powers a threaded drive shaft, mounted in a bearing assembly to rotate a ball nut lead screw. The rotating threaded shaft lifts the lead screw, which is attached to the pilot valve.

Solenoid-type pulser actuators have also been used to actuate the main pulser valve, however, there are many problems with such a system. The use of a spring to bias the solenoid requires the actuator (servo) valve to overcome the force of the spring (about 6 pounds) and of the mud prior to actuating the main valve. A typical solenoid driven actuator valve is capable of exerting only 11 pounds of pressure, leaving only 5 pounds of pressure to actuate the pulser assembly. Under drilling conditions requiring higher than normal mud flow, the limited pressures exerted by the solenoid may be unable to overcome both the pressure of the return spring and the increased pressure of the flowing mud, resulting in a failure to open the servo-valve, resulting in the main valve remaining in a position in which mud flow is not restricted, and therefore failing to communicate useful information to the surface.

A further problem with the use of a solenoid to actuate the pulser assembly is the limited speed of response and recovery that is typical of solenoid systems. Following application of a current to a solenoid, there is a recovery period during which the magnetic field decays to a point at which it can be overcome by the force of the solenoid's own return spring to close the servo-valve. This delay results in a maximum data rate (pulse width) of approximately 0.8 seconds/pulse, limiting the application of the technology.

Moreover, the linear alignment of the solenoid must be exactly tuned (i.e. the magnetic shaft must be precisely positioned within the coil) in order to keep the actuator's power characteristics within a reliable operating range. Therefore, inclusion of a solenoid within the tool adds complexity to the process of assembling and repairing the pulser actuator, and impairs the overall operability and reliability of the system.

Existing tools are also prone to jamming due to accumulation of debris, reducing the range of motion of the pilot valve. Particularly when combined with conditions of high mud flow, the power of the solenoid is unable to clear the jam, and the tool is rendered non-functional. The tool must then be brought to the surface for service.

Stepper motors have been used in mud pulsing systems, specifically, in negative pulse systems (see for example U.S. Pat. No. 5,115,415). The use of a stepper motor to directly control the main pulse valve, however, requires a large amount of electrical power, possibly requiring a turbine generator to supply adequate power to operate the system for any length of time downhole.

Repair of previous pursers has been an as yet unresolved difficulty. Typically, the entire tool has been contained within one housing, making access and replacement of small parts difficult and time-consuming. Furthermore, a bellows seal within the servo-poppet has typically been the only barrier between the mud flowing past the pilot valve's poppet and the pressurized oil contained within the servo-valve actuating tool, which is required to equalize the hydrostatic pressure of the downhole mud with the tool's internal spaces. Therefore, in order to dissemble the tool for repair, the bellows seal had to be removed, causing the integrity of the pressurized oil chamber to be lost at each repair.

Furthermore, a key area of failure of MWD pulser drivers has been the failure of the bellows seal around the servo-valve activating shaft, which separates the drilling mud from the internal oil. In existing systems, the addition of a second seal is not feasible, particularly in servo-drivers in which the servo-valve is closed by a spring due to the limited force which may be exerted by the spring, which is in turn limited by the available force of the solenoid, and cannot overcome the friction or drag of an additional static/dynamic linear seal.

It remains desirable within the art to provide a pulse generator that has an energy efficiency sufficient to operate reliably and to adapt to a variety of hostile downhole conditions, has reduced susceptibility to jamming by debris, and is simpler to repair than previous systems.

SUMMARY OF THE INVENTION

It is an object of the present invention to obviate or mitigate at least one disadvantage of previous mud pulsers and pulse generators.

In a first aspect, the present invention provides a downhole measurement-while-drilling pulser actuator comprising a servo valve movable between an open position which permits mud flow through a servo-orifice and a restricted position which restricts mud flow through the servo-orifice, the servo-valve powered to the open position and powered to the closed position by a reversible electric motor.

In one embodiment, the servo valve includes a servo-poppet powered by the motor in reciprocating linear movement towards and away from the servo-orifice.

In a further embodiment, the actuator may include a rotary to linear conversion system for converting rotary motion of the reversible electric motor into linear reciprocating movement of the poppet. The rotary to linear conversion system may include a threaded lead screw held stationary and driven in rotation by a rotary motor. In this embodiment, the lead screw may be threadably attached to a ball nut from which the poppet depends, whereby the rotary motion of the motor causes rotation of the screw to result in driven linear movement of the ball nut and the poppet in either direction.

In a further embodiment, there is provided a servo-controller for controlling the powering of the servo-valve by the electric motor. The servo-controller may further be capable of sensing the position of the poppet with respect to the servo-orifice, such that the poppet position is sensed when mud flow through the servo-orifice is restricted or unrestricted, and wherein the amount and direction of rotation of the motor from the sensed poppet position is counted and stored by the controller.

In another embodiment, the sensed position of the orifice restriction is calibrated as the fully closed position of the poppet. The poppet's travel is thereby monitored and controlled during operation to avoid unneeded collision or frictional wear between the poppet and the servo-orifice. The servo controller may sense the position of the poppet by sensing whether movement of the poppet is impeded, and the servo-controller counts the number of rotations of the motor until the poppet is impeded and compares the number of rotations to an expected number of rotations to determine the position of the poppet with respect to the servo-orifice. The expected number of rotations can be preset to allow a predetermined rate of mud flow past the servo-orifice when the poppet is moved away from the servo-orifice by the preset expected number of rotations.

In a still further embodiment, the servo-controller may include a debris clearing command that is initiated when the number of rotations counted is not equal to the expected number of rotations. The debris clearing command may cause the motor to rapidly reciprocate the poppet to dislodge any debris present between the poppet and the servo-orifice.

In another embodiment, the attachment between the poppet and the motor comprises a dynamic seal to isolate the motor, rotary to linear conversion system and related drive components from the drilling mud in which the poppet and orifice are immersed when in operation.

In a further aspect, the present invention provides a method for causing the generation of a mud pulse by a controlled pulser's main pulse valve comprising the steps of: powering a pulser servo-valve in a first direction using a rotary motor such that mud is permitted to flow past a servo-orifice to activate a main mud pulse valve; and powering the servo-valve in a second direction using the rotary motor such that mud flow past the servo-orifice is restricted to deactivate the main mud pulse valve.

In one embodiment, the method further comprises the step of cutting power to the motor to hold the servo-valve in a particular position within its range of motion to tailor the actuator's effect on the main pulse valve and thereby tailor the pressure and duration characteristics of a mud pulse.

In another aspect, the invention provides a servo-controller for use with a downhole measurement-while-drilling pulser actuator, the servo-controller comprising a sensor, memory, control circuitry, and an operator interface.

In one embodiment, the sensor is a mudflow sensor, pressure sensor, temperature sensor, rotation-step counter, position sensor, velocity sensor, current level sensor, battery voltage sensor, timer, or an error monitor.

In another embodiment, the memory stores time-stamped or counted sensed events together with an event-type indication. The servo-controller may be programmable to cause an action within the actuator responsive to a sensed event, a time, an elapsed time, a series of sensed events, or any combination thereof.

In a further embodiment, the user interface provides information from memory to the operator, and may allow an operator to alter the programming of the control circuitry.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention relates to an apparatus and method for actuating a mud pulser telemetry system used during well-drilling operations. The present apparatus allows a servo-valve to be powered both in opening and closing to activate a main mud pulser valve, and does not rely on a solenoid system. The powered opening and closing of the servo-valve results in various functional and economic advantages, including the ability to clear debris from the restricted portion of the mud flowpath, and faster data rates due to elimination of inherent operating delays in the solenoid systems of previous tools, with the end result of providing a pulser driver which consumes a minimal amount of DC power while providing more force with which to drive the servo-valve's poppet in each direction. Therefore, the actuator remains functional at a comprehensive range of downhole drilling conditions.

Furthermore, in the embodiment shown in the Figures, the present device is designed to have several independent, interconnected housings, and employs a double seal between the oil compartment and the drilling mud, which simplifies assembly and repair of the tool. The assembly/disassembly is simplified to reduce repair turnaround time by using modular components.

Figure 1A:
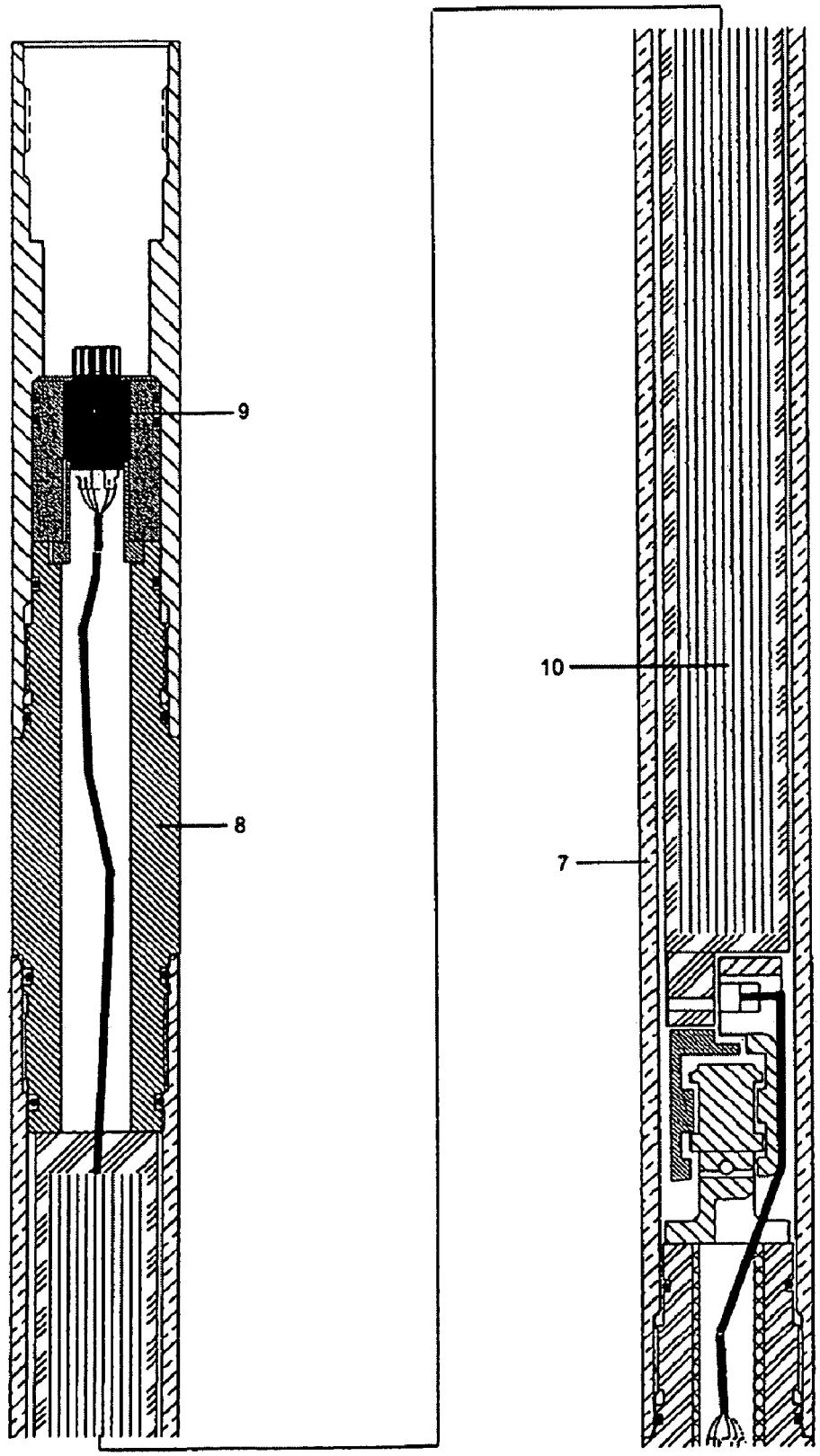
FIGS. 1A and B are a longitudinal cross sectional view of the upper and lower portions of an embodiment of the mud pulser during mud flow through the servo orifice.
Figure 1B:
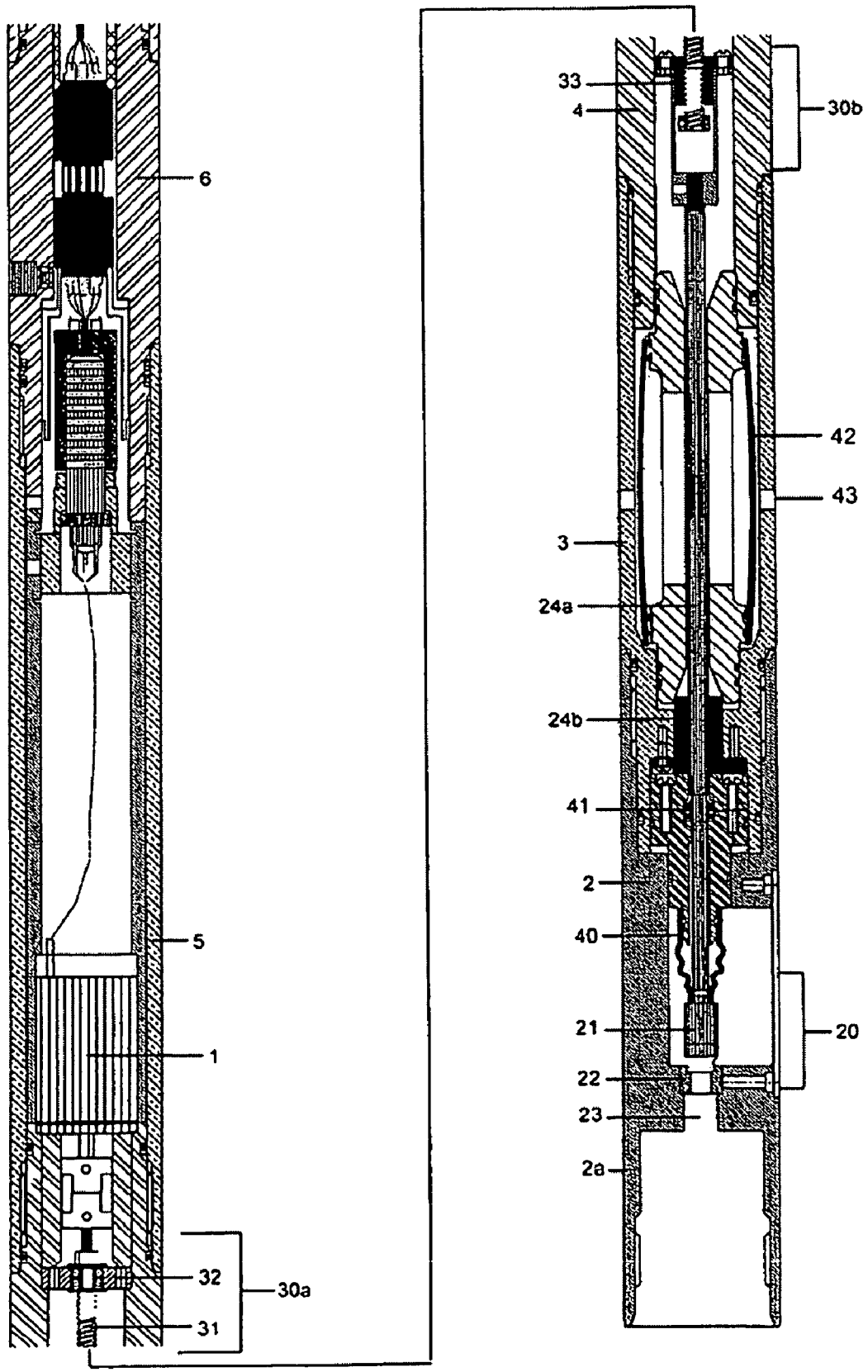

Additionally, the use of a stepper motor, electric load sensors, and control circuitry in a powered-both-directions servo-valve system will allow for self-calibration of the tool and self-diagnosis and error correction unavailable in other systems. In an embodiment of the invention, as shown in FIGS. 1A and 1B, a three-phase stepper rotary motor 1 is monitored and controlled by a servo-controller 10, the rotary movement of the motor 1 being converted into linear movement of a poppet 21, thereby opening and closing a servo-valve 20 to actuate a mud pulser main valve (not shown). Communication of information to the well surface is accomplished by encoded signals, which are translated to produce pressure surges in the downward flow of the pressurized mud. It is recognized that although the drilling fluid is generally referred to as mud, other drilling fluids are also suitable for use with the present invention, as is well known in the art.

With reference to the Figures, the mud pulser actuator is lowered downhole and, in the embodiment shown, generally includes a plurality of serially interconnected housings 2, 3, 4, 5, 6, 7, and 8, an electrical connector 9, a servo-controller 10 for controlling the operation of a rotary motor 1, and a servo-valve assembly 20 that is driven in linear motion by the rotary motor 1. The servo-valve assembly includes a poppet 21 capable of linear reciprocating movement to and from a seal surface 22 of a servo orifice 23, thereby opening and closing the servo orifice 23 to allow or prevent the passage of pressurized mud and thereby actuate a pulser (not shown, connected to the lower end 2a of the lowermost housing 2) to generate a pressure pulse for telemetric purposes.

Mechanical System

A rotary-to-linear coupling system 30a, 30b (hereinafter referred to as coupling system 30) is used to translate the torque from the rotary motor 1 into linear movement of the servo-valve shaft 24, which is preferably a series of connected shafts for transferring linear movement from the coupling system 30 to the servo poppet 21. Preferably, the servo shaft includes a spline shaft 24a, which passes through a spline coupling 24b that can be used to prevent rotation of the shaft 24a when necessary. The coupling system 30 also includes seals which serve to isolate the rotating mechanism from the downhole mud.

Figure 2A:
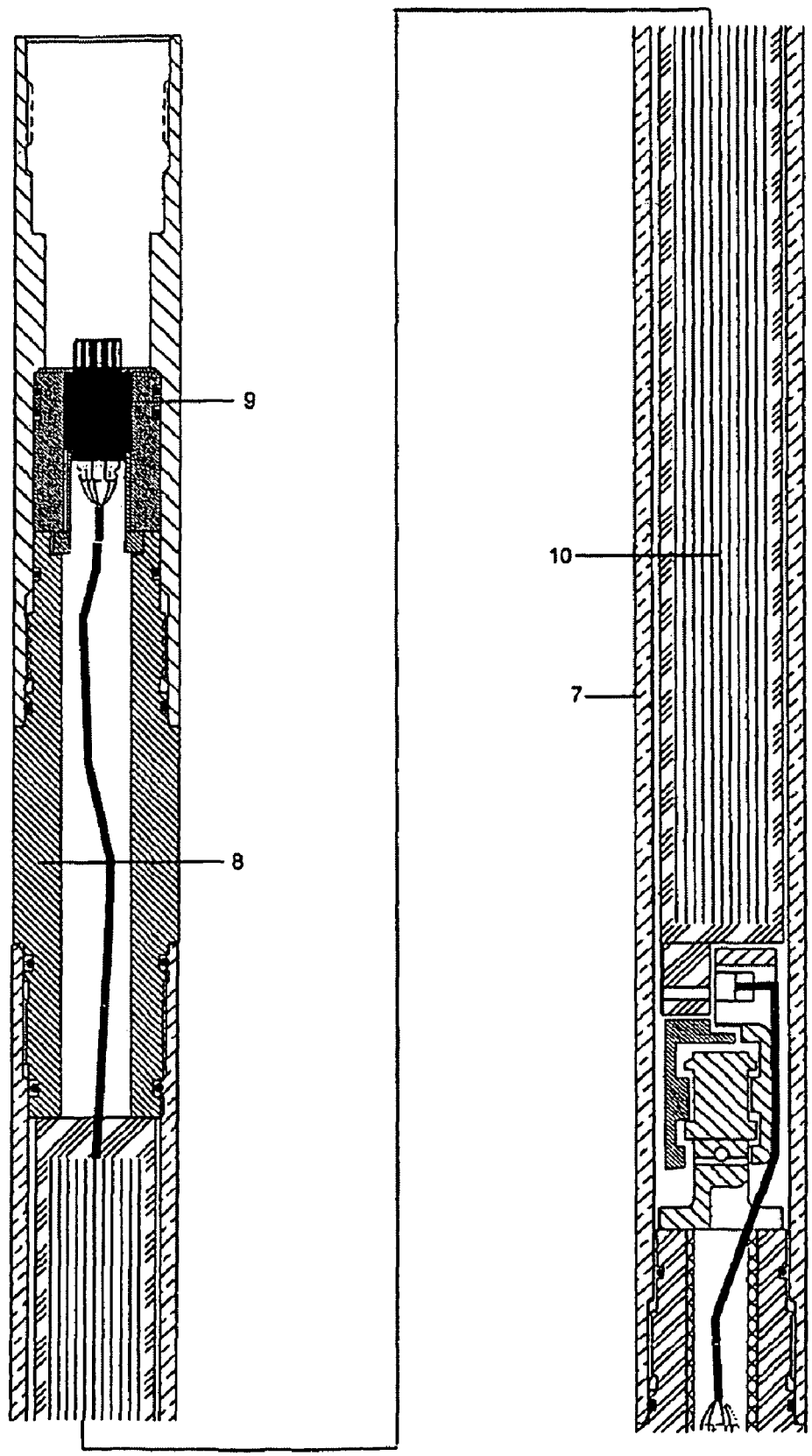
FIGS. 2A and 2B are a longitudinal cross sectional view of the upper and lower portions of an embodiment of the mud pulser during mud flow restriction by the poppet.
Figure 2B:
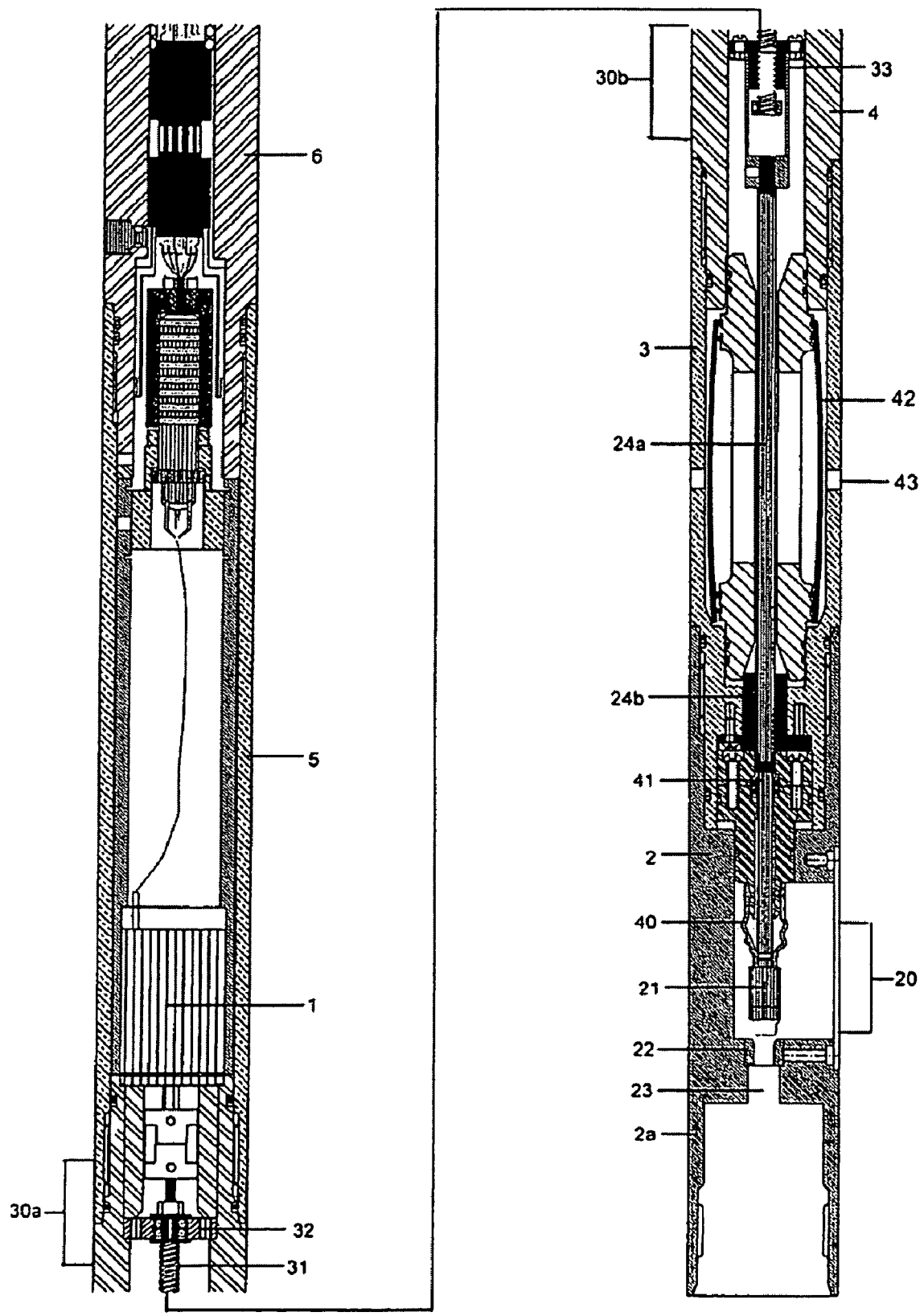

In the embodiment pictured in FIGS. 1A and 1B, the rotary motor 1, is electrically powered through an electrical connection 9, by a power source (not shown). When activated, the motor 1 rotates a lead screw 31 that is mounted within a bearing support 32, causing a ball nut 33 to move threadably along the lead screw 31. Linear movement of the ball nut 33 results in dependent linear movement of the servo shaft 24, and servo poppet 21. When driven in the forward direction, the rotary motor 1 will cause linear movement of the poppet 21 away from the servo-valve seat 22, to allow passage of pressurized mud through the servo-orifice 23 to activate the main mud pulser valve to close. When the motor 1 drives the lead screw 31 in the reverse direction, poppet 21 is urged towards the seal surface 22 to cover the servo orifice 23, as shown in FIG. 2B, and mud is therefore prevented from passing through the servo orifice 23 to actuate the mud pulser main valve to open.

The spline shaft 24 is surrounded by lubricating fluid, which must be pressurized against the downhole hydrostatic pressure. As shown, a pressure compensator in the form of a membrane or bellows 42 allows reservoir fluid to substantially equalize the pressure via a part 43. The pressure compensator be a membrane, bellows, piston type or other type known in the industry. In addition to a bellows seal 40, an additional seal 41 may be added to hold oil inside the chamber of the tool, with the bellows seal 40 preventing mud from reaching the additional seal 41. The dual seal 40, 41 maintains the integrity of the lubrication chamber during operation and during replacement of the bellows seal 40 during maintenance. The addition of this seal 41 does not negatively impact performance of the actuator due to the improved power characteristics of the system, as will be discussed below.

In a preferred embodiment, the construction of the device allows most downhole clogs, where debris in the mud may stop the poppet 21 from sealing with the seal surface 22, to be easily cleared as will be described below, and the serially interconnected housing design allows simple and rapid repair of the tool when necessary.

The valve assembly 20 is preferably composed of a wear resistant material such as tungsten carbide or ceramic to maximize the efficiency of the tool and to minimize maintenance of the tool, and is preferably replaceable.

Operation

When restriction of mud flow by the main valve is desired, the rotary motor 1 will be activated by the servo-controller 10 in the forward direction. As shown in FIG. 1B, forward powering of the rotary motor 1 will cause the lead screw 31 to turn in the forward (for example, clockwise) direction, thereby raising the ball nut 33 and lifting the servo poppet 21 from the servo-valve seat 22. This will allow mud flow to pass unrestricted through the servo-orifice 23 to actuate the main mud pulse valve, restricting mud flow to generate a pulse that is transmitted to the surface. The current-consuming portion of the circuit is then shut down until a further signal is received from the servo-controller 10. The lack of current to the motor 1 results in the motor 1 being immovable and therefore acting as a brake to prevent further movement of the poppet 21 until further activation of the motor 1.

Subsequently, when the servo-controller 10 initiates reverse motion by the motor 1, the lead screw 31 is rotated in the reverse direction (in the example, counterclockwise) by the motor 1, causing the ball nut 33 and servo shaft 24 to move towards the servo-valve seat 22 as shown in FIG. 2B. Closure of the servo-valve 20 causes opening of the main mud pulser valve to allow mud to flow unrestricted to the surface. The current-consuming portion of the circuit is then shut down until a further signal is received from the servo-controller 10. The motor again acts as a brake until further power is applied (by shorting its coils together).

The lead screw 31 and ball nut 33 may be replaced by an alternate system of rotary to linear conversion, however a lead screw 31 and ball nut 33 are advantageous as they are relatively small in size and may be provided with bearings to provide a low-friction mechanism with high load capacity, durability, and low backlash tolerance. The lead screw 31 may be held in contact with the motor 1 by a bearing support 32 or any other suitable means.

The presently described system of using a stepper motor 1 to drive a servo-valve has several advantages. The powering of the servo-valve 20 in both directions allows greater direct control of the servo-valve 20, avoids the previous necessity of using a return spring in the servo assembly, and therefore the energy required is similar to that of the force of the downhole mud flow. This results in an energy efficient system, and results to date indicate that the presently described system can supply a force of 100 pounds of pressure for less energy than previous systems, particularly than those which employ a solenoid activator. Thus, the present system can overcome higher pressures on the poppet valve 21, allowing the system to clear itself of debris, and permitting use in a wide range of downhole conditions, including conditions of higher pressure and higher volume mud flow, and in conditions when the mud is contaminated or is very dense.

Use of a rotary motor powering the servo-valve in both directions also allows the system to be more responsive than solenoid systems, resulting in a faster data rate with more accurate or precise pulse-edge timing. Experimental results indicate that data rates of 0.25 seconds/pulse are possible with this system, as compared to 0.8 to 1.5 seconds/pulse in solenoid systems.

Flow Detection & Diagnostic Software

The servo controller detects the position of the poppet 21 against the servo-valve seal 22 by counting the number of rotations made by the motor until further movement of the poppet is impeded. For example, if the poppet 21 is generally programmed to attain an unseated position that is three forward motor rotations away from the seated position, upon seating activation by the servo-controller 10, the motor will turn three reverse rotations, at which point further rotation will be impeded due to seating of the poppet 21 on the seal 23. On unseating activation by the servo controller 10, the motor will turn three complete forward rotations to return the poppet to its pre-programmed unseated position. Seating can be sensed by an increase in current drawn by the motor, from which a large opposing force (like stopped motion due to valve seating) is inferred. The control circuitry also senses rotation of the motors and can count rotations and direction of rotation.

Debris may enter the device with the mud, potentially causing jamming of the poppet. The servo controller 10 can be programmed to detect and clear jams from the servo-valve 20. For example, debris may become lodged at the servo-valve seal 22, preventing the poppet from fully sealing against the valve seal 22. In such a situation, the motor would be prevented from completing its three reverse rotations. This is sensed by the servo-controller 10, which will then attempt to dislodge the debris. The dislodging sequence may include rapid reciprocation of the poppet 21 towards and away from the seal 22, or may include further reverse rotations on the subsequent reverse rotation. For example, if the motor was able to turn only two reverse rotations, the servo-controller 10 will recognize that the valve did not properly close, and will adjust one or more subsequent forward and/or reverse rotations to ensure that the poppet 21 is able to seat against the valve seal 22. Similarly, debris may cause the poppet to not fully open, resulting in appropriate corrective action by the servo-controller on the next motor 1 activation. In either case, a processor provides a report of measurements recorded and controls the following cycle of the brushless motor's rotation accordingly.

The ability to detect and clear most jams within the tool allows a more robust design of the tool in other respects. For example, as the tool can easily clear particulate matter from the servo-valve assembly, the tool can be provided with larger and fewer mud ports, and may include reduced amounts of screening. Screening is susceptible to clogging, and so reducing screening leads to longer mean time between operation failure of the device in-hole; and will reduce the velocity of any mud flow through the tool, reducing wear on the bladder and other parts. Further, the removal of several previously necessary components (such as the return spring, transformer, and solenoid and related electronics) contributes to a tool of smaller size (in both length and diameter) that is more versatile in a variety of situations. For example, embodiments with outside diameter less than 1⅜" (approaching 1") or length less than four feet have been achieved, although these dimensions are not by way of limitation, but by example only.

Custom software also has the ability to track downhole conditions, and also uses a sensor to detect mudflow. When mudflow is detected, a signal is sent to the Directional Module Unit (not shown), to activate the overall system. The system also has the ability to time stamp events such as start or end of mudflow, incomplete cycles or system errors, low voltages, current, and the like, as well as accumulated run-time, number of pulses, number of errors, running totals of rotations or motor pulses. Wires or conductors may also be easily passed by the pulser section to service additional near-bit sensors or other devices. The software that detects the mudflow can be configured for different time delays to enable it to operate under a larger variety of downhole drilling conditions than its predecessors. The mudflow detection capability can also be used to calibrate or confirm the closed position of the poppet.

In addition, a user may monitor such data as well as any downhole sensors using a user interface attachable to the tool. Such sensors may include pressure or temperature sensors, rotation step-counters, travel or depth sensors, current levels, battery voltage, or timers. The user could monitor each component of the actuator to determine when the tool must be removed from downhole for repair. A user may, in turn, program an activity to cause an action or correction in response to a sensed event.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for causing the generation of a mud pulse by a controlled pulser's main pulse valve comprising:
    powering movement of a servo-poppet within a servo-valve in a first direction away from a servo-orifice within the servo-valve using a rotary motor via a connected rotary-to-linear transmission, such that mud is permitted to flow past the servo-orifice to activate a main mud pulse valve;
    powering the movement of the servo-poppet in a second direction toward the servo-orifice using the rotary motor and transmission such that the mud-flow past the servo-orifice is restricted to deactivate the main mud pulse valve; and
    using the motor, when unpowered, as a brake against a rotational force exerted on the motor from pressure of mud-flow on the servo-poppet at a restricted position of the servo-valve, wherein the motor acts as a brake by shorting coils of the motor together.

2. The method of claim 1, wherein the motor brakes movement of the servo-valve and the motor and transmission components' inertia holds the servo-poppet in position relative to the servo-orifice.

* * * * *